United States Patent Office 3,061,569
Patented Oct. 30, 1962

3,061,569
PROCESS OF REACTING A POLYMERIC N-VINYL LACTAM WITH A POLYMERIC CARBOXYLIC ACID AND PRODUCT OBTAINED THEREBY
George G. Stoner, Suffern, and George C. Wright, Norwich, N.Y., assignors to General Aniline & Film Corporation, New York, N.Y., a corporation of Delaware
No Drawing. Original application Nov. 15, 1954, Ser. No. 468,988. Divided and this application Dec. 10, 1958, Ser. No. 779,277
9 Claims. (Cl. 260—29.6)

This invention relates to polymeric N-vinyl lactams and more particularly to the production of water-insoluble compositions derived from polymeric N-vinyl lactams.

Polymeric N-vinyl lactams, as exemplified by polyvinylpyrrolidone (poly-1-vinyl-2-pyrrolidone), are by this time well known as extremely versatile chemicals which have found many uses in a variety of fields including the pharmaceutical, cosmetic, textile, lithographic and many others. They are colorless horn-like or glass-like materials with a high softening point, and are usually employed in solution form. They are employed in the preparation of textile assistants, finishing, thickening, sticking or binding agents, hair waving, setting and dressing compositions, pharmaceutical suspending agents, tablet binders, drug retardants, and detoxifiers, and the like. The polymeric N-vinyl lactams have the highly desirable property of being soluble in water as well as in a variety of organic solvents such as partially chlorinated and fluorinated hydrocarbons, alcohols, diols, glycerol and polyols, polyethylene glycols, ketones, lactones, nitroparaffins, as well as lower aliphatic acids. However, there are many industrial applications requiring a material having the film-forming, physiological stability, compatability and other properties of the polymeric N-vinyl lactams, in water-insoluble form.

It is an object of the instant invention to provide water-insoluble compositions derived from polymeric N-vinyl lactams. Other objects and advantages will appear as the description proceeds.

The attainment of the above objects is made possible by the instant invention which is based upon the discovery that polymeric N-vinyl lactams can be water-insolubilized by reacting them with a polymeric carboxylic acid compound. The nature of the reaction between the polymeric N-vinyl lactam and the polymeric carboxylic acid compound is not fully understood, and may involve one or more diverse mechanisms such as hydrogen bonding, electrostatic bonding, secondary valence forces or some other mechanism whether or not generally known, or the like. The reaction takes place readily under mild conditions, in an acid medium having a pH of less than about 5, preferably from about 2 to 4, usually at room temperature and within a short space of time which may be as low as a few seconds, generally without evolution or absorption of heat. The resulting product is a "complex" polymer which is insoluble in water and in a large number of solvents, and readily soluble in dilute alkali solutions. When dry it is clear to translucent, very hard and brittle, but fairly tough.

The polymeric N-vinyl lactams utilized in the preparation of the compositions of this invention are characterized by the following general structural formula:

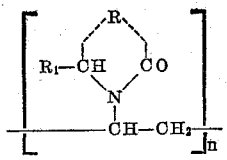

wherein R represents an alkylene bridge group necessary to complete a 5, 6 or 7-membered heterocyclic ring system, $R_1$ represents either hydrogen or a methyl group, and $n$ represents a number indicative of the extent of polymerization and is usually at least 3 or 4.

All of the specific polymeric materials characterized by the foregoing general formula are commercially available and called polymeric N-vinyl lactams. They are obtained by polymerizing organic 5, 6 or 7-membered ring compounds containing in their rings the —NH—CO-group, such as, for example, 1-vinyl-2-pyrrolidone, 1-vinyl-5-methyl-2-pyrrolidone, 1-vinyl-2-piperidone, N-vinyl-ε-caprolactam, and the like. Depending upon the extent of polymerization, they have molecular weights ranging from at least 400 up to 2,000,000 or more. Viscosity measurements are commonly used as an indication of the average molecular weight of polymeric compositions, the instant polymers being characterized by a chain of carbon atoms to which the lactam rings are attached through their nitrogen atoms:

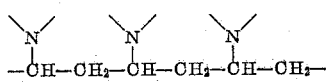

The K value (Fikentscher) of any particular mixture of polymers is calculated from viscosity data and is useful as an indication of the average molecular weight of such mixture. Its determination is fully described in "Modern Plastics," 23, No. 3, 157–61, 212, 214, 216, 218 (1945), and is defined as 1000 times $k$ in the empirical relative viscosity equation:

$$\frac{\log_{10} \eta_{\text{rel.}}}{C} = \frac{75k^2}{1+1.5kC}+k$$

wherein C is the concentration in grams per hundred cc. of polymer solution and $\eta_{\text{rel}}$ is the ratio of the viscosity of the solution to that of pure solvent. The K values are reported as 1000 times the calculated viscosity coefficient in order to avoid the use of decimals. For the purpose of the present invention, there may be employed those polymeric N-vinyl lactams having a K value of about 10 to 200, preferably of 30 to 100 because of their viscosity at lower concentrations.

K values and specific viscosities ($\eta_{\text{sp}}$) are interconvertible and are related through relative viscosity ($\pi_{\text{rel}}$). Thus, when viscosity measurements are taken on solutions which have a concentration of 1.00 gram of polymer per deciliter of solution at 25° C. ($C=1$), the relationships are as follows:

$$\pi_{\text{rel}} = \eta_{\text{sp}} + 1$$

Relative viscosity=specific viscosity plus one.
Relative viscosity
$$=10[0.001K+0.000075K^2/(1+0015K)].$$
Hence, $\eta_{\text{sp}}$
$$=-1+10[0.001K+0.000075K^2/(1+0.0015K)].$$

Relative viscosity, specific viscosity and K are dimensionless, whereas inherent viscosity $$\frac{(\log_e \eta_{\text{rel}})}{C}$$

and intrinsic viscosity (the limit of inherent viscosity as C approaches zero) have the dimensions of dilution, i.e., the reciprocal of concentration. Intrinsic viscosity and K are intended to be independent of concentration.

The number of recurring polymer units enclosed by brackets in the foregoing general structural formula, indicated by "$n$," or the extent of degree of polymerization, corresponds to a chain of roughly 4 to 20,000 monomer units or more. In actual practice, a mixture of polymeric molecules, each containing a different number ($n$) of monomer units, is always produced. The polymers are readily prepared by the procedural steps given in United States Patents 2,265,450, 2,317,804, and 2,335,454 and in which working examples of all the species characterized by the above formula are given and all of which are incorporated herein by reference to said patents.

The polymeric carboxylic acid which may be employed for insolubilizing the polymeric N-vinyl lactam in accordance with this invention may in general be described as an acidic polymeric material in which the acidity is due to free carboxyl groups. Partial salts of these polymeric carboxylic acids may be employed provided the free acid function is dominant. Such polymeric materials and their production are well known in the art and fall within several categories. As illustrative of types of synthetically produced polymeric materials containing free carboxy groups which may be employed, there may be mentioned:

(1) Homopolymers of polymerizable aliphatic monocarboxylic acids having a methylene ($CH_2$) group attached by an ethylenic double bond to a carbon atom alpha to the carboxyl carbon of the carboxylic acid group. Examples of this group are the homopolymers of carboxylic acids of the acrylic series, such as polyacrylic acid, polymethacrylic acid, poly-$\alpha$-ethacrylic acid, poly-$\alpha$-chloroacrylic acid, and the like.

(2) Interpolymers of monocarboxylic acids of the acrylic series with polymerizable vinyl or vinylidene compounds, for example interpolymers of methacrylic acid with methyl methacrylate, methacrolein, vinyl acetate or styrene.

It will be understood that in the foregoing description of the polymeric carboxylic acids, the monomers employed in their production may also be in the form of functional derivatives of the monomeric acids, such as the corresponding acid nitriles, amides, halides, and the like. The monomers and resulting polymers may likewise be substituted by other non-interfering groups such as halide, hydroxyl, ether, ester, alkyl, aryl, and the like.

The extent of polymerization of the polymeric carboxylic acid will in general be determined by the particular polymeric N-vinyl lactam to be treated, and the particular method of treatment employed. In general, the molecular weights of the polymeric carboxylic acids to be employed may range from about 400 up to 2,000,000 or more, as determined by appropriate viscosity measurements.

As stated supra, the mechanism of the reaction is not fully understood, but there is evidence that definite complexes are formed. It has been found that regardless of the proportions of polymeric N-vinyl lactam and polymeric carboxylic acid employed, the reaction product obtained from any specific polymeric N-vinyl lactam and polymeric carboxylic acid always has substantially the same properties and contains the two polymeric components in the same proportions. Accordingly, the proportions of polymeric N-vinyl lactam and polycarboxylic acid to be employed is not particularly critical except where an excess of one of the polymers in the product is not desired or is present in such large amount as to prevent the attainment of the desired results. In general, the desired results are achieved by use of weight ratios of polymeric N-vinyl lactam to polycarboxylic acid of from about 4:1 to 1:4.

The manner of carrying out the reaction between the polymeric starting components is not critical. Where permissible, it is preferred to carry out the reaction by dissolving or dispersing the components separately in water in the desired concentration, and then mixing the two solutions. The reaction product is precipitated readily at room temperature usually in a few seconds or minutes, and can then be washed and dried. If desired, the polymeric components may be separately dissolved or dispersed in other solvents of an organic or inorganic nature miscible with each other (different or the same) and the solutions mixed to form the reaction product in the same manner. In some instances, where the polymeric carboxylic acid is a liquid, the polymeric components may be reacted in the absence of a solvent or diluent.

As further features of this invention, the above described reaction may be made use of in a variety of applications, as follows:

(A) The product may be employed in lithographic applications where more durable finishes having a basis of polymeric N-vinyl lactams such as polyvinylpyrrolidone are desired. Its production from aqueous solutions, its water insolubility, and its solubility in dilute alkali render such use highly advantageous.

(B) The reaction products have shown good ability to aggregate soil. If desired, the complex reaction products may be formed in the soil in situ by mixing the components with the soil in either order in the form of powders or aqueous solutions.

(C) The products may be employed as anti-static agents in the treatment of fibrous materials. They may be applied directly to the fiber or fabric, incorporated into the spinning solution during the production of synthetic fibers, or they may be produced in situ by incorporation of one polymeric component into the spinning solution followed by treatment with the other polymeric component subsequent to spinning. The solubility properties of the reaction products herein render their use advantageous in the latter embodiment, which requires a substance which would dissolve in the spinning solution, which would be exuded from the fiber at a rate sufficient to reduce static, which would not spot with water and which would be insoluble in the common dry cleaning fluids.

(D) The reaction products may be employed as protective coatings, impregnants and permanent sizing agents, especially where alkali solubility is not a liability. For example in the treatment of cellulose acetate, application of the product may be accomplished from an aqueous solution of the ammonium salt followed by heating to reduce water sensitivity, from an aqueous dispersion of the product, or from an emulsion thereof. Similarly, other materials such as paper of all types, paper-type containers, leather, and the like may be coated or impregnated with the reaction product from solution or dispersion in water or organic solvent media.

(E) They may be employed as adhesives to join two surfaces together. In such application, one surface may be advantageously coated with the polymeric N-vinyl lactam, if desired in solution form, and the other surface coated with the polymeric carboxylic acid, also if desired in solution form. Forcing the two surfaces together results in formation of the reaction product in situ. Curing occurs at room temperature.

(F) They may be shaped into fibers by extrusion into a mineral acid bath from a dilute alkali solution thereof. Such fibers may, if desired, be employed as scaffolding threads by spinning or otherwise fabricating them with other fibers and then dissolving them in dilute alkali to obtain fibrous products of improved porosity or ornamental effects.

(G) In most instances, the reaction between the polymeric N-vinyl lactam and the polymeric carboxylic acid takes place quantitatively whereby the reaction may serve as an analytical means for determining concentrations of one of the polymeric components by precipitation of the other.

(H) Because of their alkali solubility, they may be employed as modifying agents for certain synthetic fibers to reduce swelling in water. Thus, the polymeric components may be dissolved in alkali spinning solutions of viscose, cuprammonium cellulose, proteinaceous products and the like, and then cross-linking completed after spinning in the acid spinning bath. Alternatively, the polymeric N-vinyl lactam may be incorporated into the spinning solution and the polymeric carboxylic acid incorporated into the spinning bath to obtain similar results.

The following example in which parts are by weight unless otherwise indicated is illustrative of the instant invention and is not to be regarded as limitative:

*Example 1*

To an aqueous 5% solution of PVP, K 60, an aqueous solution of 2% polyacrylic acid [specific viscosity of 0.15 (K=23)] was added at room temperature with hand-stirring in proportions to give weight ratios of 1:3, 1:1 and 3:1 of PVP to polyacrylic acid. Within a few seconds, heavy white precipitates resulted. The product of ratio 1:1 was washed with distilled water at room temperature and was insoluble in acetone, ethanol, carbon tetrachloride and dimethylformamide at room temperature. The product was soluble in dilute sodium hydroxide at room temperature and in dimethtylformamide at 65° C. Upon drying at 43° C. and 3 inches of Hg for 2 days, a hard white porous solid results. In another experiment, where the above complex was prepared on a larger scale, the product was clear, light-yellow, very hard and fairly tough. This product may be employed as a sizing agent for synthetic fibers, as a flameproofing agent for textiles, paper and rubber, as a waterproofing agent for textiles, as an agent to facilitate dyeing of fibers, as a soil conditioner and as a protective coating. Analysis: 6.84% N; 58.4%C; 7.06%H (27.7% O by difference).

This application is a division of our copending application Serial No. 468,988 filed on November 15, 1954, now U.S. Patent No. 2,901,457.

This invention has been disclosed with respect to certain preferred embodiments, and various modifications and variations are to be included within the spirit and purview of this application and the scope of the appended claims.

We claim:

1. A process comprising reacting a polymeric N-vinyl lactam having the formula

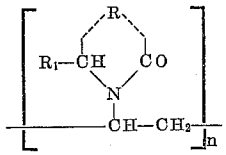

wherein R represents an alkylene bridge group necessary to complete a 5 to 7-membered heterocyclic ring system; $R_1$ is selected from the group consisting of hydrogen and methyl; and $n$ has a value of at least 3, with a polymeric carboxylic acid selected from the group consisting of homo-polymers of carboxylic acids of the acrylic series, and interpolymers of such acids with vinylidene compounds by admixing said lactam and said acid in a weight ratio of from about 4:1 to 1:4 at a pH of less than about 5 to produce a water insoluble complex.

2. The process of claim 1 wherein the polymeric N-vinyl lactam is polyvinylpyrrolidone.

3. The process of claim 2 wherein the polymeric carboxylic acid is polyacrylic acid.

4. A process comprising mixing, at a pH of less than about 5 an aqueous solution of a polymeric N-vinyl lactam having the formula

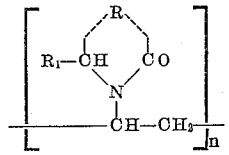

wherein R represents an alkylene bridge group necessary to complete a 5 to 7-membered heterocyclic ring system; $R_1$ is selected from the group consisting of hydrogen and methyl; and $n$ has a value of at least 3, with an aqueous solution of a polymeric carboxylic acid selected from the group consisting of homopolymers of carboxylic acids of the acrylic series, and interpolymers of such acids with vinylidene compounds, the weight ratio of said lactam to said acid in the mixture being from about 4:1 to 1:4 to produce a water-insoluble complex.

5. The process of claim 4 wherein the polymeric N-vinyl lactam is polyvinylpyrrolidone and the polymeric carboxylic acid is polyacrylic acid.

6. A process comprising mixing at a pH of less than about 5 a solution of a polymeric N-vinyl lactam having the formula

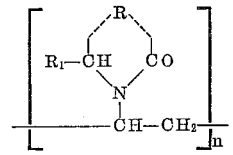

wherein R represents an alkylene bridge group necessary to complete a 5 to 7-membered heterocyclic ring system; $R_1$ is selected from the group consisting of hydrogen and methyl; and $n$ has a value of at least 3, in an organic solvent with a solution of a polymeric carboxylic acid, selected from the group consisting of homopolymers of carboxylic acids of the acrylic series, and interpolymers of such acids with vinylidene compounds in an organic solvent miscible with the first mentioned solvent, the weight ratio of said lactam to said acid in the mixture being from about 4:1 to 1:4, to produce a water-insoluble complex.

7. The product of claim 1.
8. The product of claim 2.
9. The product of claim 3.

References Cited in the file of this patent

UNITED STATES PATENTS

| | | |
|---|---|---|
| 2,072,465 | Reppe et al. | Mar. 2, 1937 |
| 2,265,450 | Reppe | Dec. 9, 1941 |
| 2,901,457 | Stoner et al. | Aug. 25, 1959 |
| 2,923,692 | Ackerman et al. | Feb. 2, 1960 |
| 2,932,550 | Walmsley | Apr. 12, 1960 |